United States Patent
Gagliardi

(10) Patent No.: US 8,566,800 B2
(45) Date of Patent: Oct. 22, 2013

(54) DETECTION OF METHOD CALLS TO STREAMLINE DIAGNOSIS OF CUSTOM CODE THROUGH DYNAMIC INSTRUMENTATION

(75) Inventor: Marco Gagliardi, Brisbane, CA (US)

(73) Assignee: CA, Inc., Islandia, NY (US)

( * ) Notice: Subject to any disclaimer, the term of this patent is extended or adjusted under 35 U.S.C. 154(b) by 585 days.

(21) Appl. No.: 12/777,496

(22) Filed: May 11, 2010

(65) Prior Publication Data
US 2011/0283264 A1 Nov. 17, 2011

(51) Int. Cl.
G06F 9/44 (2006.01)
G06F 11/30 (2006.01)

(52) U.S. Cl.
USPC .......................................... 717/130; 702/182

(58) Field of Classification Search
None
See application file for complete search history.

(56) References Cited

U.S. PATENT DOCUMENTS

| | | | |
|---|---|---|---|
| 5,689,709 A | 11/1997 | Corbett et al. |
| 6,470,494 B1 | 10/2002 | Chan et al. |
| 6,985,909 B2 | 1/2006 | Blohm |
| 7,017,155 B2 | 3/2006 | Peev et al. |
| 7,058,957 B1 | 6/2006 | Nguyen |
| 7,206,807 B2 | 4/2007 | Cheenath |
| 7,293,260 B1 | 11/2007 | Dmitriev |
| 7,398,533 B1 | 7/2008 | Slaughter et al. |
| 7,469,262 B2 | 12/2008 | Baskaran et al. |
| 7,483,927 B2 | 1/2009 | Anglin et al. |
| 7,546,593 B2 | 6/2009 | Petev et al. |
| 7,571,427 B2 | 8/2009 | Wang et al. |
| 7,614,045 B2 | 11/2009 | Kuck et al. |
| 2002/0199172 A1 | 12/2002 | Bunnell |
| 2003/0115584 A1 | 6/2003 | Fahs et al. |
| 2003/0149960 A1 | 8/2003 | Inamdar |
| 2003/0163608 A1* | 8/2003 | Tiwary et al. ..................... 710/1 |
| 2004/0078691 A1 | 4/2004 | Cirne et al. |
| 2004/0133882 A1 | 7/2004 | Angel et al. |
| 2004/0163077 A1 | 8/2004 | Dimpsey et al. |
| 2004/0230956 A1 | 11/2004 | Cirne et al. |
| 2005/0039172 A1 | 2/2005 | Rees et al. |
| 2005/0261879 A1 | 11/2005 | Shrivastava et al. |
| 2005/0273667 A1 | 12/2005 | Shrivastava et al. |

(Continued)

FOREIGN PATENT DOCUMENTS

WO 2009/095741 A1 8/2009

OTHER PUBLICATIONS

Extended European Search Report dated Aug. 16, 2011, European Patent Application No. 11250520.1-1225.

(Continued)

Primary Examiner — Hyun Nam
(74) Attorney, Agent, or Firm — Vierra Magen Marcus LLP

(57) ABSTRACT

A technique for analyzing software in which un-instrumented components can be discovered and dynamically instrumented during a runtime of the software. Initially, an application configured with a baseline set of instrumented components such as methods. As the application runs, performance data is gathered from the instrumentation, and it may be learned that the performance of some methods is an issue. To analyze the problem, any methods which are callable from a method at issue are discovered by inspecting the byte code of loaded classes in a JAVA Virtual Machine (JVM). Byte code of the class is parsed to identify opcodes which invoke byte code to call other methods. An index to an entry in a constants pool table is identified based on an opcode. A decision can then be made to instrument and/or report the discovered methods.

19 Claims, 11 Drawing Sheets

(56) References Cited

U.S. PATENT DOCUMENTS

| | | | |
|---|---|---|---|
| 2005/0273787 | A1 | 12/2005 | Kovachka-Dimitrova et al. |
| 2006/0174226 | A1 | 8/2006 | Fair et al. |
| 2007/0150870 | A1 | 6/2007 | Fitch et al. |
| 2007/0168998 | A1 | 7/2007 | Mehta et al. |
| 2007/0234307 | A1 | 10/2007 | Luk et al. |
| 2007/0283331 | A1 | 12/2007 | Pietrek |
| 2008/0034352 | A1 | 2/2008 | McKinney et al. |
| 2008/0148242 | A1 | 6/2008 | Cobb et al. |
| 2008/0222614 | A1 | 9/2008 | Chilimbi et al. |
| 2008/0276227 | A1 | 11/2008 | Greifeneder |
| 2008/0288212 | A1* | 11/2008 | Greifeneder ........... 702/182 |
| 2008/0288962 | A1 | 11/2008 | Greifeneder |
| 2009/0013210 | A1 | 1/2009 | McIntosh et al. |
| 2009/0112667 | A1 | 4/2009 | Blackwell et al. |
| 2009/0144305 | A1 | 6/2009 | Little |
| 2009/0254889 | A1* | 10/2009 | Prasadarao ........... 717/130 |
| 2009/0282125 | A1 | 11/2009 | Jeide et al. |
| 2009/0320045 | A1* | 12/2009 | Griffith et al. ........... 719/315 |
| 2010/0131930 | A1 | 5/2010 | Ben-Chaim et al. |
| 2010/0257603 | A1 | 10/2010 | Chander et al. |

OTHER PUBLICATIONS

Morajko et al., "Design and implementation of a dynamic tuning environment," Journal of Parallel and Distributed Computing, vol. 67, No. 4, Mar. 24, 2007, pp. 474-490.

Extended European Search Report dated Sep. 1, 2011, European Patent Application No. 11250522.7-1225.

Response to Search Opinion dated Sep. 5, 2012, European Patent Application No. 11250520.1-1225.

Response to Search Opinion dated Oct. 16, 2012, European Patent Application No. 11250847.8.

Response to the Search Opinion of the Extended European Search Report dated Oct. 28, 2011, European Patent Application No. 11250522.7.

Extended European Search Report dated Dec. 19, 2011, European Patent Application No. 11250847.8.

Preliminary Amendment dated Apr. 25, 2011, U.S. Appl. No. 12/777,490, filed May 11, 2010.

U.S. Appl. No. 12/777,490, filed May 11, 2010.

U.S. Appl. No. 12/777,506, filed May 11, 2010.

Response to Extended Search Report dated May 16, 2012, European Patent Application No. 11250521.9.

U.S. Appl. No. 12/903,102, filed Oct. 12, 2010.

Dmitriev, "Design of JFluid: A Profiling Technology and Tool Based on Dynamic Bytecode Instrumentation," SMLI TR-2003-125, Nov. 17, 2003, Sun Microsystems, Inc., pp. 1-19.

Binder et al., "Advanced Java Bytecode Instrumentation," PPPJ 2007, Sep. 5-7, 2007, Lisboa, Portugal. Copyright 2007 ACM.

Extended European Serach Report dated Sep. 19, 2011, European Patent Application No. 11250521.9-1225.

Response to Office Action dated Apr. 17, 2013, U.S. Appl. No. 12/903,102, filed Oct. 12, 2010.

Non-Final Office Action dated Dec. 6, 2012, U.S. Appl. No. 12/777,490, filed May 11, 2010.

Non-Final Office Action dated Jan. 2, 2013, U.S. Appl. No. 12/777,506, filed May 11, 2010.

Non-Final Office Action dated Jan. 17, 2013, U.S. Appl. No. 12/903,102, filed Oct. 12, 2010.

Mirgorodskiy, Alexander V., et al., "CrossWalk: A tool for performance profiling across the user-kernel boundary," Advances in Parallel Computing, vol. 13, 2004, pp. 745-752.

Response to Office Action dated Mar. 6, 2013, U.S. Appl. No. 12/777,490, filed May 11, 2010.

Notice of Allowance and Fee(s) Due dated Mar. 19, 2013, U.S. Appl. No. 12/777,490, filed May 11, 2010.

Response to Office Action dated Apr. 1, 2013, U.S. Appl. No. 12/777,506, filed May 11, 2010.

Final Office Action dated May 15, 2013, U.S. Appl. No. 12/777,506, filed May 11, 2010.

European Office Action dated Jun. 12, 2013, European Patent Application No. 11 250 847.8-1951.

Final Office Action dated Aug. 15, 2013, U.S. Appl. No. 12/903,102, filed Oct. 12, 2010.

\* cited by examiner

DETECTION OF METHOD CALLS TO STREAMLINE DIAGNOSIS OF CUSTOM CODE THROUGH DYNAMIC INSTRUMENTATION

BACKGROUND OF THE INVENTION

1. Field of the Invention

The present invention is directed to technology for monitoring software in a computing environment.

2. Description of the Related Art

The growing presence of the Internet as well as other computer networks such as intranets and extranets has brought many new applications in e-commerce, education and other areas. Organizations increasingly rely on such applications to carry out their business or other objectives, and devote considerable resources to ensuring that they perform as expected. To this end, various application management techniques have been developed.

One approach involves monitoring the infrastructure of the application by collecting application runtime data regarding the individual software components that are invoked in the application. This approach can use agents that essentially live in the system being monitored. For example, using instrumentation of the software, a thread or process can be traced to identify each component that is invoked, as well as to obtain runtime data such as the execution time of each component. Tracing refers to obtaining a detailed record, or trace, of the steps a computer program executes. One type of trace is a stack trace. Traces can be used as an aid in debugging. However, deciding which components to instrument can be problematic. An over-inclusive approach can result in excessive overhead costs and possibly impair the operation of the application, while an under-inclusive approach can result in the omission of important performance data. As a result, analysis and diagnosis of software can be problematic.

SUMMARY OF THE INVENTION

The present invention provides a technique for analyzing software which addresses the above and other issues.

In one embodiment, a computer-implemented method for analyzing an application includes the computer-implemented steps of identifying at least one method in the application to analyze, determining a class of the at least one method from among loaded classes in memory, loading a byte code representation of the class from a resource location, parsing the byte code representation of the class to identify one or more instances of an invoke byte code and, based on the one or more instances of the invoke byte code, identifying one or more referenced methods. The method further includes storing the one or more referenced methods as a string.

In another embodiment, a computer-implemented method for analyzing an application includes identifying at least one instrumented method to analyze in a first instance of the application at a first application server, determining a class of the at least one instrumented method from among loaded classes in memory, loading a byte code representation of the class from a resource location, parsing the byte code representation of the class to identify one or more instances of invoke byte codes and, based on the one or more instances of the invoke byte code, identifying one or more un-instrumented and referenced methods. The method further includes reporting the one or more un-instrumented and referenced methods from the first application server to a central manager, where the central manager pushes an identification of the one or more un-instrumented and referenced methods to a second instance of the application at a second application server.

Another embodiment provides a tangible computer readable storage having computer readable software embodied thereon for programming at least one processor to perform a method for analyzing an application. The method performed includes instrumenting components in the application, obtaining performance data from the instrumented components, determining that performance data of at least one component of the instrumented components falls below a threshold performance level, and in response to the determining, triggering a process for identifying and instrumenting one or more components which are callable by the at least one component, and which are currently un-instrumented.

Corresponding methods, systems and computer- or processor-readable storage devices which include a storage media encoded with instructions which, when executed, perform the methods provided herein, may be provided.

DETAILED DESCRIPTION

The present invention provides a technique for analyzing software in which un-instrumented components can be discovered and dynamically instrumented during a runtime of the software. Initially, software such as an application can be configured with a baseline set of instrumented components such as methods. As the application runs, performance data can be gathered from the instrumentation, and it may be learned that the performance of some methods is below expectations or is otherwise an issue. To analyze the problem, a technique can be used to discover any methods which are callable from a method at issue. In a particular implementation, the callable methods are discovered by inspecting the byte code of loaded classes in a JAVA Virtual Machine (JVM).

A decision can then be made to instrument and/or report the discovered methods. By selectively adding instrumentation, additional performance data can be obtained from the discovered components to allow a deep diagnosis of a performance problem without initially requiring over-inclusive instrumentation. Thus, the goals of efficient and lightweight instrumentation can be achieved along with the capability for a deep diagnosis when needed.

Figure 1:
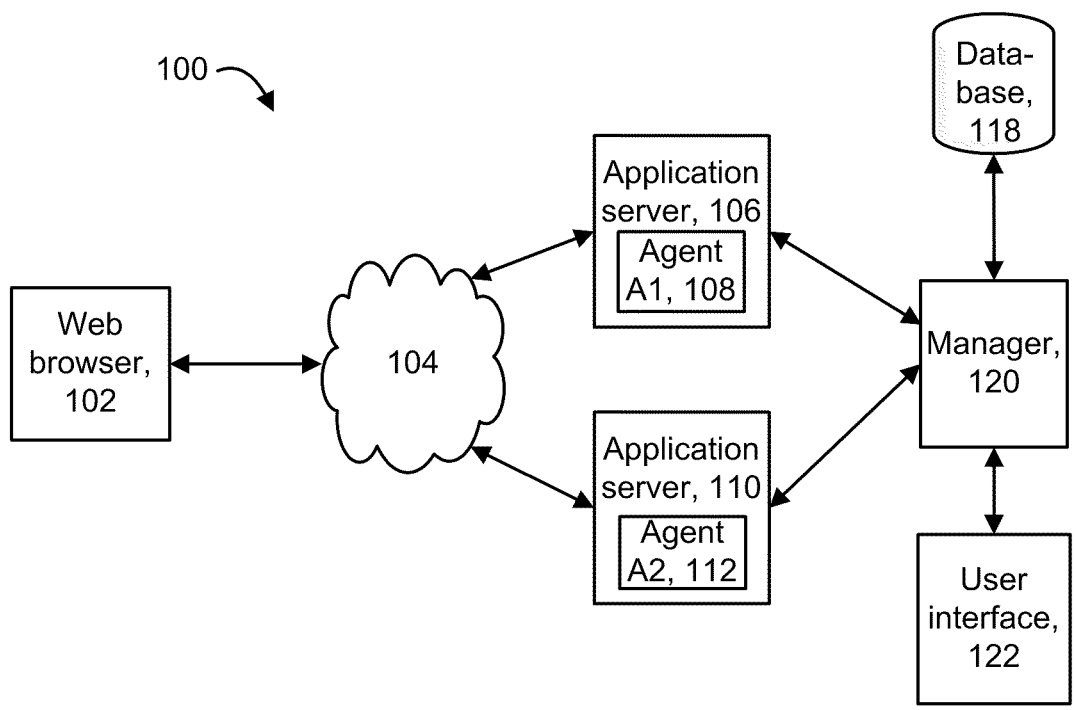
FIG. 1 depicts a system which includes a managed application.

FIG. 1 depicts a network in which different computer systems provide data to a manager. Example computer systems may include application servers 106 and 110 or any other type of computer system having a processor for executing code to achieve a desired functionality. The application servers can run different applications, or separate instances of the same application. The application servers can be located remotely from one another or co-located. The application servers 106 and 110 communicate with a local manager computer 120, in this example. The manager computer 120 could alternatively be remote from the application servers 106 and 110, in which case communication between them may occur via a network cloud 104.

For example, a corporation running an enterprise application such as a web-based e-commerce application may employ a number of application servers at one location for load balancing. Requests from users, such as from an example web browser 102 of a user, are received via the network cloud 104 such as the Internet, and can be routed to any of the application servers 106 and 110. The web browser 102 typically accesses the network cloud 104 via an Internet Service Provider, not shown. Agent software running on the application servers 106 and 110, denoted by Agent A1 (108) and Agent A2 (112), respectively, gather information from an application, middleware or other software, running on the respective application servers 106 and 110, in one possible approach. For example, such information may be obtained using instrumentation, one example of which is byte code instrumentation. However, the gathered data may be obtained in other ways as well. The agents essentially live in the computer system being monitored and provide a data acquisition point. The agents organize and optimize the data communicated to the manager 120.

Various approaches are known for instrumenting software to monitor its execution. For example, as mentioned at the outset, tracing may be used to track the execution of software. One example of tracing is discussed in U.S. Patent Application Publication No. 2004/0078691, titled "Transaction Tracer", published Apr. 22, 2004, incorporated herein by reference. In one approach discussed therein, object code or byte code of an application to be monitored is instrumented, e.g., modified, with probes. The probes measure specific pieces of information about the application without changing the application's business or other logic. Once the probes have been installed in the byte code of an application, it is referred to as a managed application. The agent software receives information such as performance data from the probes and may communicate the information to another process, such as at the manager 120, or process the information locally, such as to determine whether the information indicates an abnormal condition. For example, the information from the probes may indicate performance data such as start and stop times of a transaction or other execution flow, or of individual components within a transaction/execution flow. This information can be compared to pre-established criteria to determine if it within bounds. If the information is not within bounds, the agent can report this fact to the manager so that appropriate troubleshooting can be performed. The agents 108, 112 and 116 are typically aware of the software executing on the local application servers 106 and 110, respectively, with which they are associated.

The manager 120 can be provided on a separate computer system such as a workstation which communicates with a user interface 122, such as a monitor, to display information based on data received from the agents. See example displays in FIGS. 4A-C and 9. The manager can also access a database 118 to store the data received from the agents. In the example provided, the application servers can communicate with the manager 120 without accessing the network cloud 104. For example, the communication may occur via a local area network. In other designs, the manager 120 can receive data from the agents of a number of application servers via the network cloud 104. For instance, some large organizations employ a central network operations center where one or more managers obtain data from a number of distributed agents at different geographic locations. To illustrate, a web-based e-commerce enterprise might obtain agent data from servers at different geographic locations that receive customer orders, from servers that process payments, from servers at warehouses for tracking inventory and conveying orders, and so forth. The manager 120 and user interface display 122 might be provided at a corporate headquarters location. Other applications which are not necessarily web-based or involve retail or other sales, can similarly employ agents and managers for managing their systems. For example, a bank may use an application for processing checks and credit accounts. Moreover, in addition to the multi-computer system arrangements mentioned, a single computer system can be monitored as well with one or more agents.

Figure 2:
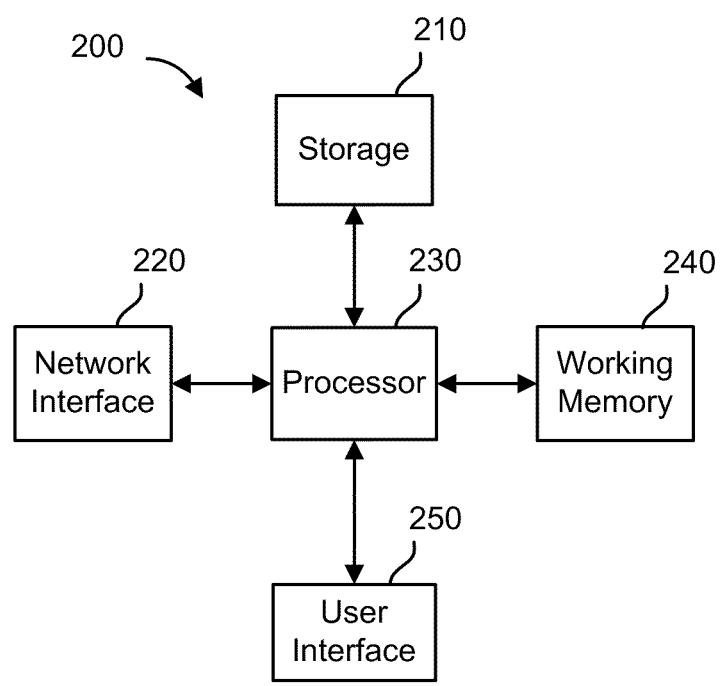
FIG. 2 depicts a computer system of the network of FIG. 1.

FIG. 2 depicts a computer system of the network of FIG. 1. The computer system 200 is a simplified representation of a system which might be used as the web browser 102, host (such as application servers 106 and 110), central manager 120 and/or user interface 122, such as discussed in connection with FIG. 1. The computer system 200 includes a storage device 210 such as a hard disk or portable media, a network interface 220 for communicating with other computer systems, a processor 230 for executing software instructions, a working memory 240 such as RAM for storing the software instructions after they are loaded from the storage device 210, for instance, and a user interface display 250. The storage device 210 may be considered to be a processor readable storage device having processor readable code embodied thereon for programming the processor 230 to perform methods for providing the functionality discussed herein. The user interface display 250 can provide information to a human operator based on the data received from one or more agents. The user interface display 250 can use any known display scheme, whether graphical, tabular or the like. In addition to an on-screen display, an output such as a hard copy such from a printer can be provided.

Further, the functionality described herein may be implemented using hardware, software or a combination of both hardware and software. For software, one or more tangible processor readable storage devices having processor readable code embodied thereon for programming one or more processors may be used. The tangible processor readable storage devices can include computer readable media such as volatile and nonvolatile media, removable and non-removable media. For example, tangible computer readable media may include volatile and nonvolatile, removable and non-removable media implemented in any method or technology for storage of information such as computer readable instructions, data structures, program modules or other data. Examples of tangible computer readable media include RAM, ROM, EEPROM, flash memory or other memory technology, CD- ROM, digital versatile disks (DVD) or other optical disk storage, magnetic cassettes, magnetic tape, magnetic disk storage or other magnetic storage devices, or any other medium which can be used to store the desired information and which can be accessed by a computer. In alternative embodiments, some or all of the software can be replaced by dedicated hardware including custom integrated circuits, gate arrays, FPGAs, PLDs, and special purpose processors. In one embodiment, software (stored on a storage device) implementing one or more embodiments is used to program one or more processors. The one or more processors can be in communication with one or more tangible computer readable media/storage devices, peripherals and/or communication interfaces.

Figure 3:
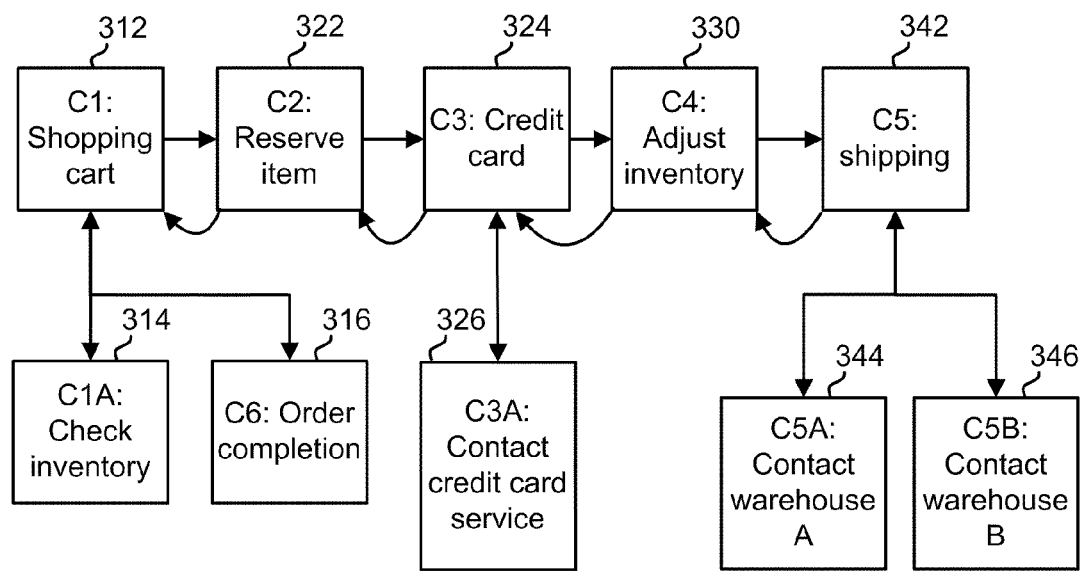
FIG. 3 depicts calling relationships of components in an execution path.

FIG. 3 depicts calling relationships of components in an execution path. Components are depicted in an application which may run on an application server such as application server 106 or 110 of FIG. 1. The sequence of components provided herein is an example of one possible type of execution path. Each component which is invoked can be considered part of an execution path. Note that, when an application is instrumented, typically only selected components are instrumented based on the developer's understanding of the application and selection of components which are expected to be of interest. Thus, many components which are not deemed to be of interest, at least initially, may be invoked in an application, but are not included in execution paths.

Component oriented programming models are useful in allowing the programmer to assemble an application or other program from building blocks referred to as components. Each component can perform a specific function which fits in with an overall functionality of the software. Furthermore, a component can call other components, as well as calling itself, in a recursive call, so that a sequence of components is invoked in a program. The components are examples of resources in a computer system that are consumed, or work that is done, when a program executes. One example of a component oriented programming model is J2EE, which can employ components such as a Java Server Page, an Enterprise Java Bean, a servlet, and a Java Database Connectivity component. However, other component oriented programming models may also be used, such as those using Microsoft .NET components. Moreover, the programming model need not be object oriented. In one approach, the components are considered to be methods.

The specific example shown refers to a web-based e-commerce application which allows users to order items. The components correspond to business logic or e-commerce steps in the application. In particular, a component C1 312 provides a shopping cart which allows a user to select an item to purchase and to enter information such as the payment method, e.g., type of credit card and credit card number, and the shipping information, e.g., the address to which the item is to be shipped and the method of shipping, e.g., ground delivery or overnight air delivery. C1 312 calls a component C1A 314 to check an inventory to determine if the selected item is in stock. Once it is determined that the selected item is in stock, C1 312 calls a component C2 322, which reserves the item so that it will not be sold to another user while the transaction is still pending. Once finished, C2 322 calls a component C3 324, which checks the user's credit card information to authorize and validate the purchase. This typically involves communicating with an external server that is managed by a credit card clearinghouse. For example, C3 324 can call a component C3A 326 which contacts a credit card service.

Once C3 324 successfully finishes, thereby approving the purchase, it calls a component C4 330 which adjusts an inventory by decrementing the quantity of the item which is purchased. C4 330 calls a component C3 342 which arranges for the item to be shipped, such as by contacting a warehouse, where a shipping label is printed and an operator is prompted to manually locate and pack the item. For example, C5 342 can call a component C5A 344, which contacts a warehouse A, and/or a component C5B 346, which contacts a warehouse B.

Once the components C2-C5 have executed, the execution path returns to C1 312, which calls an order completion component C6 316 to confirm the purchase to the user such as by providing an order confirmation number and a tracking number, e.g., in a confirmation e-mail or web page. The execution path can similarly return to C1 312 if the inventory is out of stock at C1A 314 or the credit card payment is unsuccessful at C3 324. In one possible implementation, C1 and C6 are Java Server Pages and C2-C5 are Enterprise JavaBeans.

Note that a first component can continue executing after calling another component, which begins executing, in an asynchronous, multi-thread or multi-process mode, or can temporarily pause until the called component has finished executing, in a synchronous, single-thread or single-process mode. For example, C1 312 can pause while the components C2-C5 execute. Moreover, a given component may be invoked more than once during a transaction. For example, assume the user has purchased multiple items that are stored at different warehouses. In this case, C5 342 may execute repeatedly, contacting a different warehouse and/or warehouse department for each item.

Figure 4A:
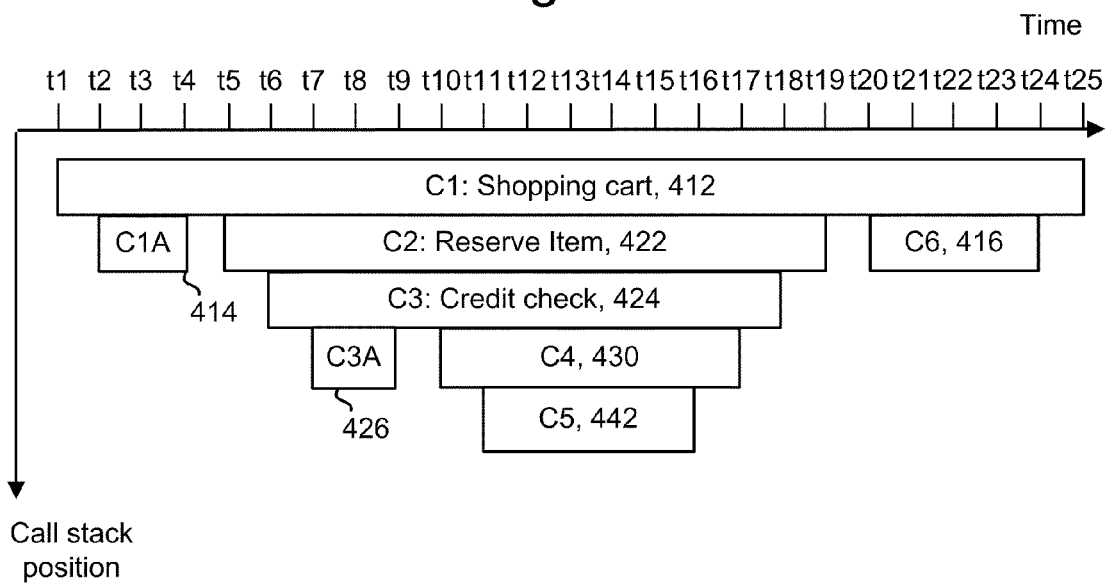
FIG. 4A depicts a first call stack position vs. time graph based on the calling relationships of FIG. 3.

FIG. 4A depicts a first call stack position vs. time graph based on the calling relationships of FIG. 3. The time increments are not necessarily evenly spaced. The representation, a transaction trace, is an example of the type of execution path information provided by one or more hosts. It can be a graphical representation which is provided as a report on a user interface, for instance, and represents performance data in the form of execution times of components such as methods. The execution path information can identify which methods of an application are invoked and the time in which they are invoked. The horizontal direction represents time, while the vertical direction indicates call stack depth or position. A call stack identifies methods which have been called or invoked during the execution of one or more programs or threads. An execution path will typically extend for a fraction of a second to a few seconds.

An example execution path includes the sequence: C1 (412), C1A (414), C1 (412), C2 (422), C3 (424), C3A (426), C3 (424), C4 (430), C5 (442), C4 (430), C3 (424), C2 (422), C1 (412), C6 (416) and C1 (412). A host receives a request from a client and notes when C1 begins executing at t1. Each transition in the sequence is noted by the agent based on instrumentation. C1 calls C1A at t2. C1A completes executing at t4. C1 calls C2 at t5. C2 calls C3 at t6. C3 calls C3A at t7. C3A completes executing at t9. C3 calls C4 at t10. C4 calls C5 at t11. C5 completes executing at t16. C4 completes executing at t17. At t18, C3 completes executing. C2 completes executing at t19. C1 calls C6 at t20. C6 completes executing at t24. The host provides a response to the client, at which time C1 completes executing, at t25. The host periodically reports time and transaction data to the central manager.

Figure 4B:
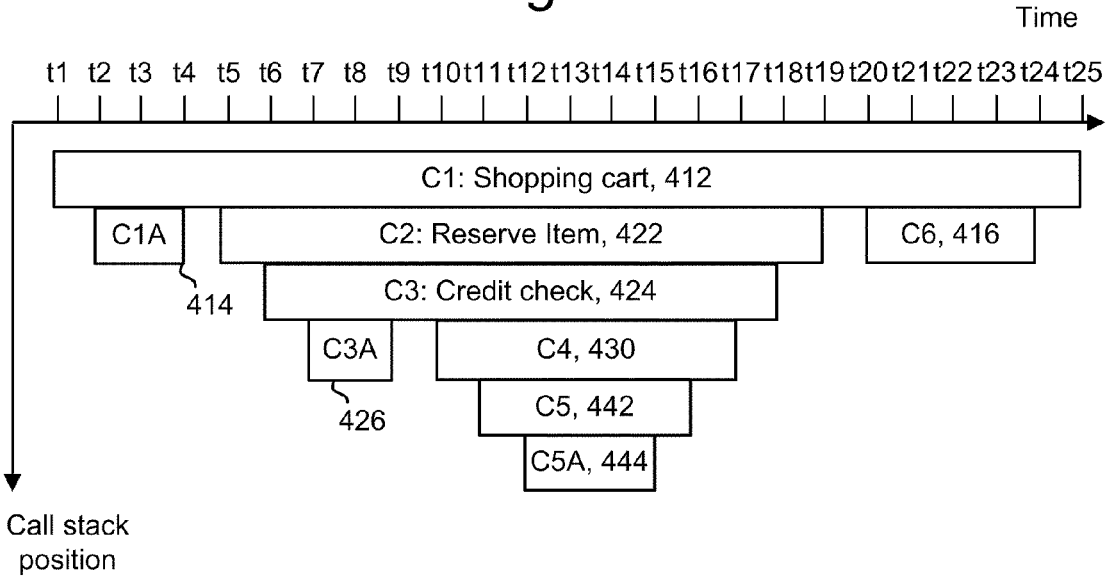
FIG. 4B depicts a second call stack position vs. time graph based on the calling relationships of FIG. 3, where a component C5A is identified and instrumented.

FIG. 4B depicts a second call stack position vs. time graph based on the calling relationships of FIG. 3, where a component C5A is identified and instrumented. As an example, assume that performance data such as response time indicates that the response time of C5 (442), which is t16-t11, is too long and exceeds a threshold level. In this case, no information is known regarding any methods which might be called by C5. In this example, the techniques described herein are used to discover that a component/method C5A (444) is callable from C5. A callable component may be, but is not necessarily, called by another component. A method which is called directly by C5 may be considered to be a child method, while a method which is called by a child method of C5 is a grandchild method of C5, and so forth. Once a callable method is identified, it can be instrumented to obtain performance data from it. However, such instrumentation is not required as the callable method can be reported an analyzed by other means as well.

In this case, C5A is instrumented after it is discovered, and the application continues to execute so that new performance data is gathered. The call stack position vs. time graph of FIG. 4B is assumed to be same as in FIG. 4A for simplicity, although it represents different method invocation instances, and the time t1-t25 of FIG. 4B occurs after the time t1-t25 in FIG. 4A. The graph indicates that C5 has called C5A (444) at t12, and C5A executes until t15, so that the response time of C5A is t15-t12. This can provided an important aid in diagnosing and analyzing the application. For example, it may be concluded that C5A is the reason for the excessive execution time. The method discovery process can also determine that C5B is callable from C5. In the example of FIG. 4B, we may assume that C5B has instrumentation added to it. However, since it was not called in this example, it can be concluded that C5B is not reason for the excessive execution time. This is important diagnostic information which would otherwise be unavailable.

Figure 4C:
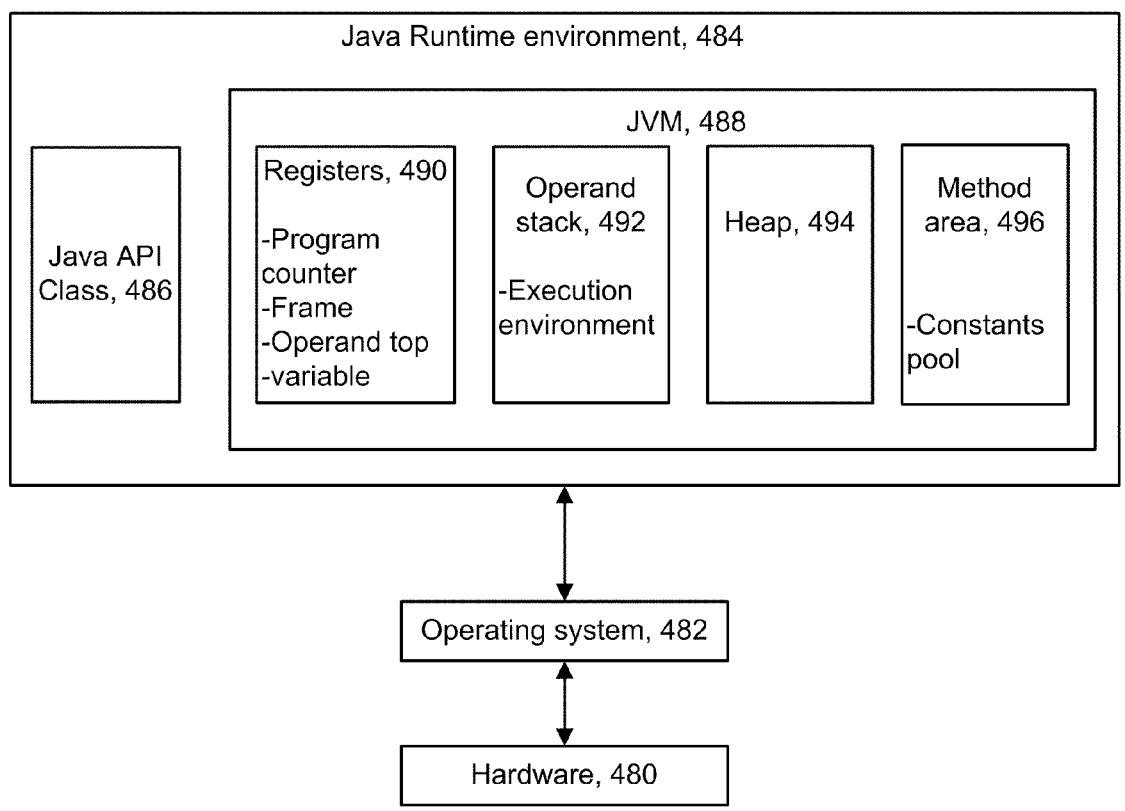
FIG. 4C depicts a JAVA runtime environment.

FIG. 4C depicts a JAVA runtime environment. The JAVA runtime environment 484 is built on an operating system, 482, which is built on hardware 480. The JAVA runtime environment 484 includes a number of virtual parts, including the JAVA API Class 486 and a JVM 488. The JVM includes registers 490, an operand stack 492, a heap 494 and a method area 496. The JVM processes a stream of byte codes as a sequence of instructions. A JVM instruction consists of an opcode specifying the operation to be performed, followed by zero or more operands embodying values to be operated upon. The operand stack 492, heap 494 and method area 496 are within addressable memory. The size of an address is 32 bits, each memory location contains one byte, and each register stores one 32-bit address. The method area 496 contains byte codes and is aligned on byte boundaries, while the operand stack 492 and the heap 494 are aligned on word (32-bit) boundaries.

The registers 490 includes a program counter (pc), which keeps track of where in the memory it should be executing instructions. The program counter identifies the next byte code to be executed. The frame register contains a pointer to the execution environment of the current method in the operand stack. The operand top (optop) register contains a pointer to the top of the operand stack, and is used to evaluate arithmetic expressions. The variable (vars) register contains a pointer to local variables.

The operand stack 492 supplies parameters to methods and operations and receives results back from them. All byte code instructions take operands from the stack, operate on them, and return results to the stack. The operand stack includes a stack frame of an executing method. The stack frame holds the state, e.g., local variables, and intermediate results of calculations, for a particular invocation of a method. Specifically, each JVM thread has a private JVM stack, created at the same time as the thread. A JVM stack stores frames, holds local variables and partial results, and plays a part in method invocation and return. A frame is thus used to store data and partial results, as well as to perform dynamic linking, return values for methods, and dispatch exceptions. A new frame is created each time a method is invoked. A frame is destroyed when its method invocation completes, whether that completion is normal or abrupt (it throws an uncaught exception). Frames are allocated from the JVM stack of the thread creating the frame. Each frame has its own array of local variables, its own operand stack, and a reference to the runtime constant pool of the class of the current method.

The heap 494 or memory allocation pool is garbage collected. The heap is the runtime data area from which memory for all class instances and arrays is allocated. The heap is created on virtual machine start-up, and heap storage for objects is reclaimed by an automatic storage management system known as a garbage collector. Specifically, each program running in the Java runtime environment has a garbage-collected heap assigned to it. Moreover, each class in the heap has a constant pool associated with it. Because constants do not change, they are usually created at compile time. Items in the constant pool encode all the names used by any method in a particular class. The class contains a count of how many constants exist, and an offset that specifies where a particular listing of constants begins within the class description.

The method area 496 stores byte code instructions that are associated with methods in the compiled code, and a symbol table which the execution environment needs for dynamic linking. Any debugging or additional information that might need to be associated with a method is stored in this area as well. The program counter always points to, e.g., contains the address of, some byte in the method area. The program counter is used to keep track of the thread of execution. After a byte code instruction has been executed, the program counter will contain the address of the next instruction to execute.

The method area 496 is shared among all JVM threads, and stores per-class structures such as the runtime constant pool, field and method data, and the code for methods and constructors, including the special methods used in class and instance initialization and interface type initialization. The method area is created on virtual machine start-up. A runtime constant pool is a per-class or per-interface runtime representation of the constant_pool table in a class file. It contains several kinds of constants, ranging from numeric literals known at compile time, to method and field references that must be resolved at run time. Each runtime constant pool is allocated from the JVM's method area. The runtime constant pool for a class or interface is constructed when the class or interface is created by the JVM.

Figure 5A:
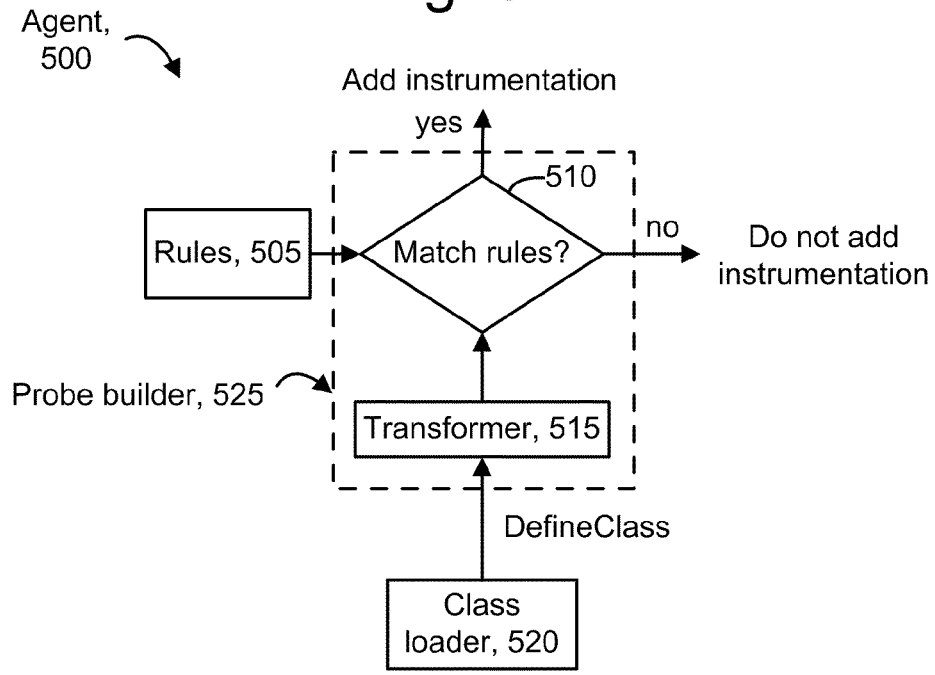
FIG. 5A depicts a JAVA-based example process flow for static instrumentation.

FIG. 5A depicts a JAVA-based example process flow for static instrumentation. The process may be implemented by an agent 500, such as the agent 108 or 112 of FIG. 1, in one possible approach. One approach to instrumentation involves providing static rules which determine which components, such as methods, are to be instrumented. The rules are accessed at the time the components are loaded into the application. In such an approach, a class loader 520 is used to provide raw data bytes of an application byte code to a transformer 515, which transforms the raw bytes into a class, for instance. For example, in JAVA, this may involve using the method defineClass of the ClassLoader object, which is responsible for loading classes. The class ClassLoader is an abstract class. Given the name of a class, a class loader should attempt to locate or generate data that constitutes a definition for the class. A typical strategy is to transform the name into a file name and then read a "class file" of that name from a file system. The method defineClass converts an array of bytes into an instance of class Class. Instances of the class Class represent classes and interfaces in a running JAVA application. The transformer 515 is thus software which can transform byte code to add instrumentation, such as by transforming classes. In one approach, the minimum unit of processing of the transformer 515 is a class file and its byte array.

If the application byte code matches rules (directives) 505 at a decision block 510, the transformer 515 adds probes in the form of tracer byte code. If the application byte code does not matches the rules 505 at the decision block 510, the transformer 515 does not add instrumentation to the byte code. The transformer 515 and the decision block 510 may be considered to be part of a probe builder 525.

In this implementation, the rules 505 are a set of typically static rules that identify portions of the managed application which are to be instrumented. The rules are usually implemented when a class is defined in a virtual machine for the first time. A class can be loaded multiple times while being defined only once. For example, there can be multiple class loaders loading the same class. Further, components such as classes may be instrumented based on whether they are named a certain way, whether they implement a certain interface, whether they extend a certain subclass or super class, and so forth. Such components are selected to be instrumented because it is believed they might provide performance data which is useful or otherwise interesting.

For instance, a rule may indicate that all servlets should be instrumented since it is believed that at least some of the servlets may provide interesting data. In this case, the rules 505 may indicate that all components that are subclasses of the JAVA class HttpServlet should be instrumented. HttpServlet is an abstract class from which all servlets depend. However, not all components can be instrumented, and there is a tension in that over-inclusive instrumentation results in excessive overhead costs and possibly impairing the operation of the application, while under-inclusive instrumentation results in the omission of important performance data.

Figure 5B:
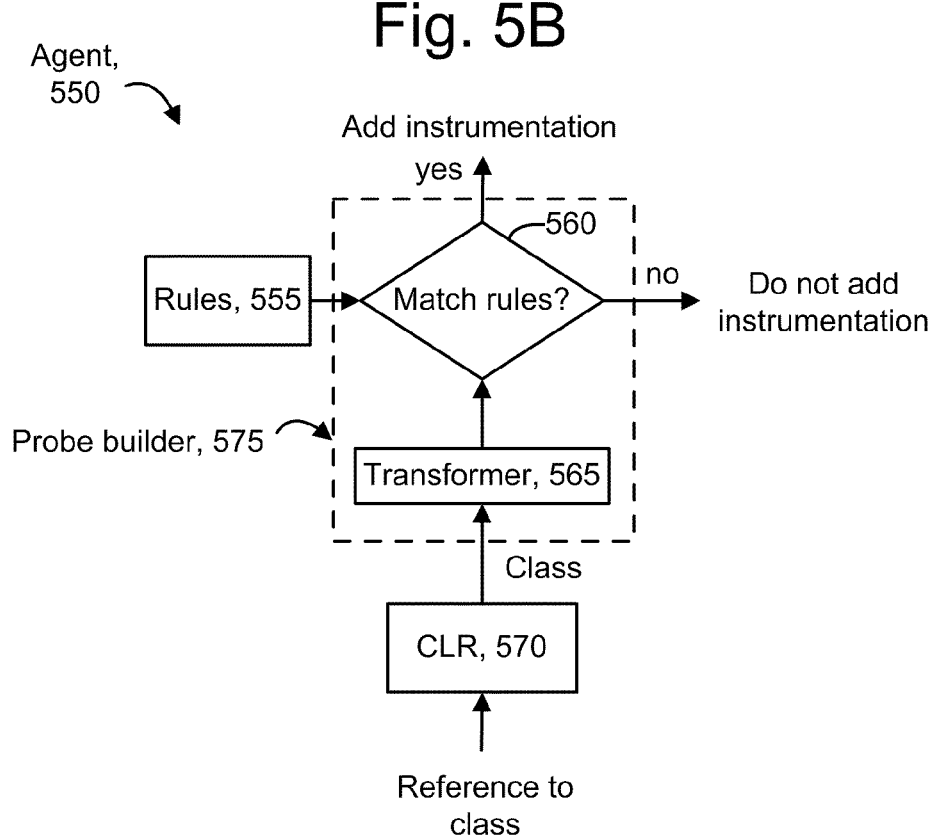
FIG. 5B depicts a .NET-based example process flow for static instrumentation.

FIG. 5B depicts a .NET-based example process flow for static instrumentation. In another possible approach, the components of the managed application are provided according to the MICROSOFT CORP. ".NET" Framework. Unlike JAVA, the .NET framework does not use class loaders. Instead, .NET includes a virtual machine that manages the execution of programs written specifically for the framework. The runtime environment of the .NET framework is known as the Common Language Runtime (CLR). The CLR provides the appearance of an application virtual machine so that programmers need not consider the capabilities of the specific CPU that will execute the program. The CLR also provides other services such as security, memory management, and exception handling. A class library of pre-coded solutions and the CLR together compose the .NET Framework.

Moreover, the CLR is an implementation of a Common Language Infrastructure (CLI) which provides a language-neutral platform for application development and execution, including functions for exception handling, garbage collection, security, and interoperability. The CLI includes the core class libraries, Common Type System, and the Common Intermediate Language (CIL). As with JAVA byte code, CIL is another example of intermediate byte code. JAVA and .NET provide example implementations only, as other implementations are possible.

Here, the process may be implemented by an agent 550, in one possible approach. In one possible scenario, some process in the .NET framework references a class by name, and the CLR 570 finds the class, shows it to a transformer 565 (if any) and uses the resultant CIL. In particular, if the class matches rules 555 at a decision block 560, instrumentation is added. If the class does not match the rules 555 at the decision block 560, instrumentation is not added. The transformer 565 and the decision block 560 may be considered to be part of a probe builder 575.

Figure 6:
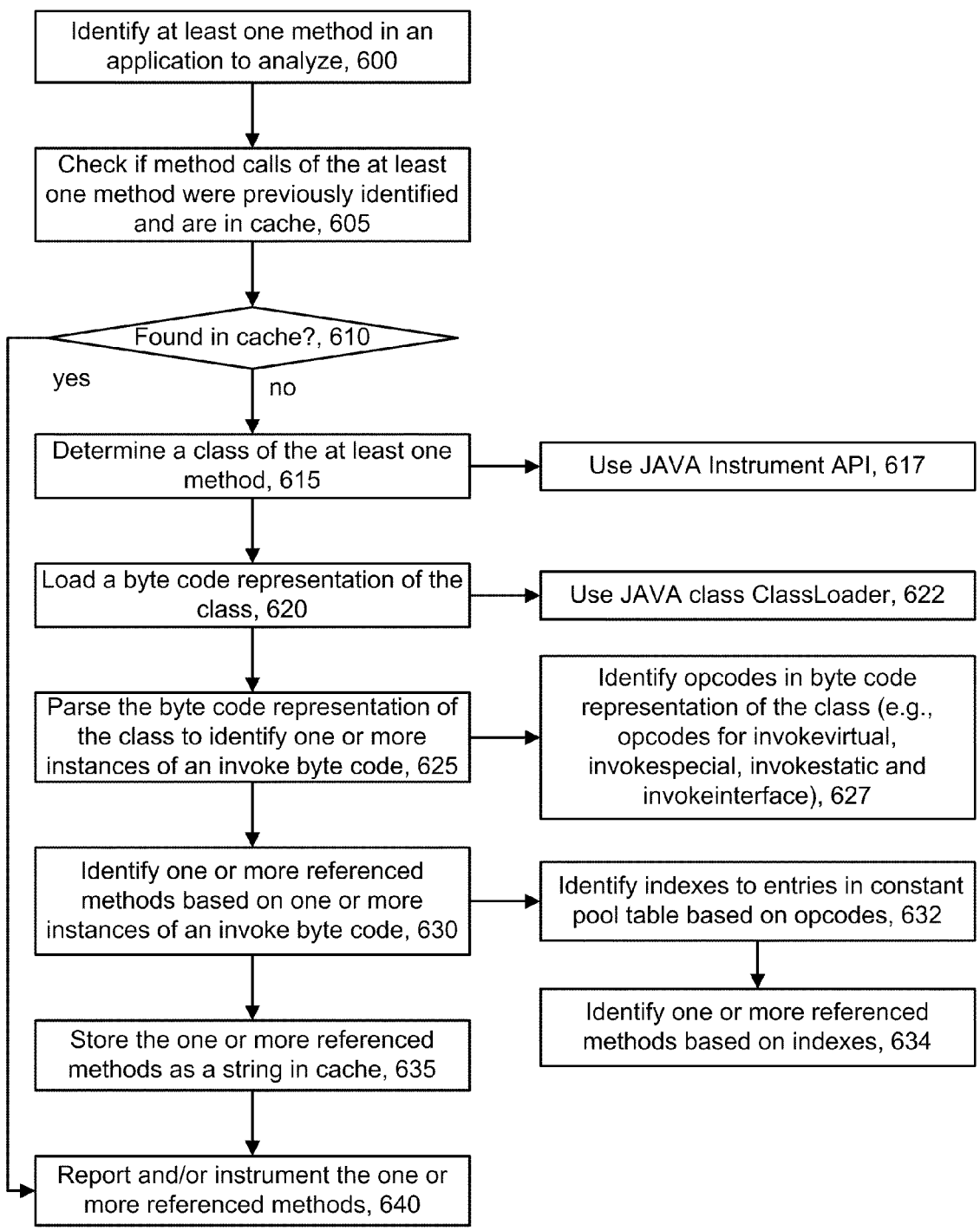
FIG. 6 depicts a method for analyzing software by identifying callable methods.

FIG. 6 depicts a method for analyzing software by identifying callable methods. As mentioned, the amount of instrumentation must be limited to avoid excessive overhead, so that the ability to understand the operation of an application is limited. In some cases, the source code could be reviewed if it was available to try to diagnose the application, but the source code is usually not available, and is not readily understandable to most users. As a result, the user does not know which additional methods should be instrumented to obtain relevant information for diagnosing the application. Instead, a deeper understanding and diagnosis of an application can be achieved by selectively discovering callable methods which are currently un-instrumented and would therefore otherwise go unnoticed. These additional methods can be instrumented during a diagnosis session, and subsequently the instrumentation can be removed. The techniques provided herein are also useful in adding instrumentation to custom software, where a standard instrumentation package may overlook portions of the code for which instrumentation would be desirable. The agent can use the techniques to discover, on-demand, the portions of code that may be called by a specific method or set of methods. Byte code analysis is used in an example implementation.

Step 600 includes identifying at least one method in an application to analyze. Further details are provided in FIG. 10. This can be at least one method which is already instrumented, such as based on static rules which determine which components, such as methods, are to be instrumented when the components are loaded into the application, as discussed in connection with FIGS. 5A and 5B. In another approach, the at least one method may be instrumented after it is loaded into the application. The at least one method may be identified based on performance data, for instance, which indicates a performance problem with the at least one method. This identification can be performed by continuously monitoring the performance data and providing a report to a user on a user interface, for instance. See, e.g., FIG. 9. Performance data which is out of range, based on comparison with preset limits, can be automatically flagged. The user may then manually select one or more methods to instrument. In another possible approach, the process is fully automated, not requiring user intervention, so that an identified method is automatically instrumented. Step 605 includes checking a cache to determine if method calls of the at least one method are present. The cache can be within a virtual machine of the agent of the application server in which the application is running, for instance.

Generally, the cache may be provided for execution performance. When the application begins executing, the cache is empty. Assume that the at least one method identified in step 600 is called method doSomething( ). The process to retrieve its callable methods begins. The first thing we do is to look into the cache. If the callable methods are not in cache, at decision step 610, then steps 615 to 635 are performed to identify the callable methods and store them in cache. Step 635 caches the method calls retrieved for doSomething( ) using the following pseudo-code: cache.put([{classLoader of the class}; {class where the doSomething( ) method is defined}; doSomething( )], [callable method 1, callable method 2 . . . ]); where ([{classLoader of the class}; {class where the doSomething( ) method is defined}; doSomething( )] is the key unequivocally identifying the method doSomething( ), and the callable methods are the identified callable methods for doSomething( ). The next time that the procedure is activated for the method doSomething( ), the cache will contain the information retrieved previously; therefore, we do not need to execute steps 615 to 635 anymore, because we have the information on the method called in the cache. We retrieve the information by the key described above.

Figure 11:
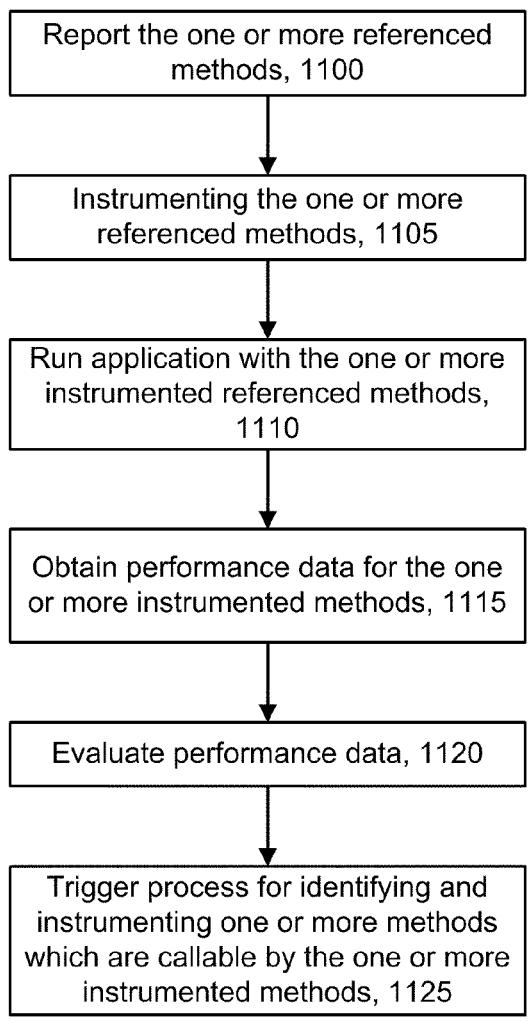
FIG. 11 provides further details of step 640 of FIG. 6.
Figure 12:
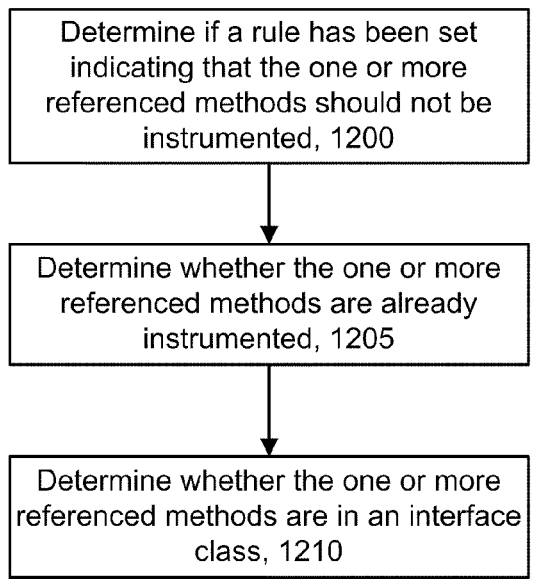
FIG. 12 provides further details of step 640 of FIG. 6.

Thus, if the callable methods of the at least one identified method of step 600 are in the cache as one or more referenced methods, at decision step 610, then the one or more referenced methods can be reported and/or instrumented at step 640, as discussed further in connection with FIGS. 11 and 12. If the callable methods of the at least one identified method of step 600 are not in the cache, at decision step 610, then steps 615 to 635 are performed. Step 615 determines a class of the at least one method through reflection. In one possible implementation, this includes using the JAVA application programming interface (API), java.lang.instrument (step 617). The at least one method may be considered to be an invoking method since it can invoke or call one or more callable methods. Step 615 can include determining a class of the at least one method, such as by fetching a JAVA class from among all loaded classes in memory, e.g., in the JVM.

Step 620 includes loading a byte code representation of the class, such as from an original resource location from which the byte code was obtained. In an example implementation, the JAVA class ClassLoader is used, if available (step 622). Note that a safety precaution can be enforced to limit the amount of code which is loaded in memory in step 620 so that very large, automatically generated classes will not overwhelm the memory.

Step 625 includes parsing a byte code representation of each class obtained in step 620 to identify one or more instances of an invoke byte code. In a particular implementation, this includes identifying specific opcodes (operation codes) in the byte code representation of a class (step 627). For instance, four opcodes in the JAVA language identify a byte code which can invoke another method. Specifically, the opcode for invokevirtual is decimal value 182 or hexadecimal value (0xb6 or b6), the opcode for invokespecial is decimal value 183 or hexadecimal value (0xb7 or b7), the opcode for invokestatic is decimal value 184 or hexadecimal value (0xb8 or b8), and the opcode for invokeinterface is decimal value 185 or hexadecimal value (0xb9 or b9). The presence of any of these opcodes identifies callable methods.

It is also possible to limit step 625 to detecting one or more specified opcodes, but fewer than all possible opcodes. For instance, it may be determined that an interface method is not of interest, in which case only the opcodes for invokevirtual, invokespecial and invokestatic, but not invokeinterface, are detected.

Step 630 identifies one or more referenced methods based on the one or more instances of an invoke byte code. In an example implementation, the one or more referenced methods are extracted from a constant pool of the class determined at step 615. Specifically, step 632 identifies indexes to entries in a constant pool table based on the opcodes, and step 634 identifies one or more referenced methods based on the indexes. Step 635 stores the one or more referenced methods as a string in cache, e.g., the called methods for doSomething( ). Step 640 includes reporting and/or instrumenting the one or more referenced methods, as discussed further in connection with FIGS. 11-14.

Note that the process of FIG. 6 can be performed separately for each of a number of different methods, at the same time or at different times.

Figure 7:
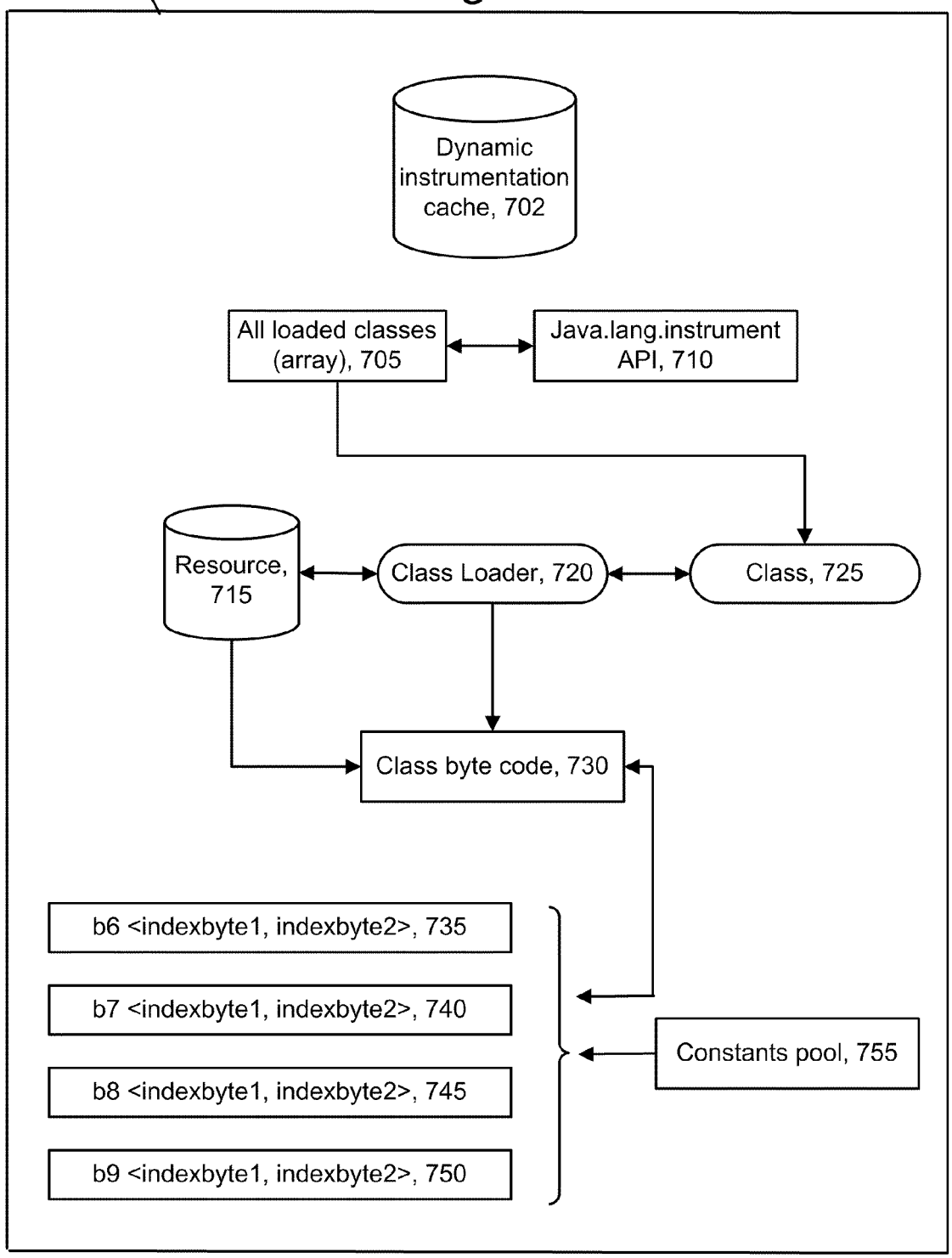
FIG. 7 depicts software and hardware which can be used in connection with the method of FIG. 6.

FIG. 7 depicts software and hardware, shown collectively at 700, which can be used in connection with the method of FIG. 6. Hardware includes a dynamic instrumentation cache 702 and a memory resource 715. As mentioned in connection with steps 605, 610 and 640 of FIG. 6, the dynamic instrumentation cache may store the callable methods which have been identified for a method which is being analyzed. The callable method can then be quickly identified from the cache if a subsequent analysis of the same method is performed, without performing steps 615 to 630 of FIG. 6, thereby reducing the consumption of computing resources. The resource 715 can be a memory location which is used for storing byte code of different classes of the application which is loaded into memory when the application is instrumented and begins executing. In one possible implementation, the dynamic instrumentation cache 702 and the resource 715 are provided in the memory 240 of FIG. 2 in an application server.

The java.lang.instrument API 710 is used to access all loaded classes 705 to determine a particular class 725 of the at least one method being analyzed, in correspondence with steps 615 and 617 of FIG. 6. In one approach, all loaded classes are provided in an array. Based on the class 725, a class loader 720 is used to access the resource 715 to load class byte code 730 for the class 725, in correspondence with steps 620 and 622 of FIG. 6. The class byte code 730 is parsed to identify one or more instance of opcodes 735, 740, 745 and 750, in correspondence with steps 625 and 627 of FIG. 6. Each opcode can have respective index bytes, <indexbyte1, indexbyte2> which are used to fetch a string of a method call from a constants pool 755, in correspondence with steps 630, 632 and 634 of FIG. 6.

Figure 8:
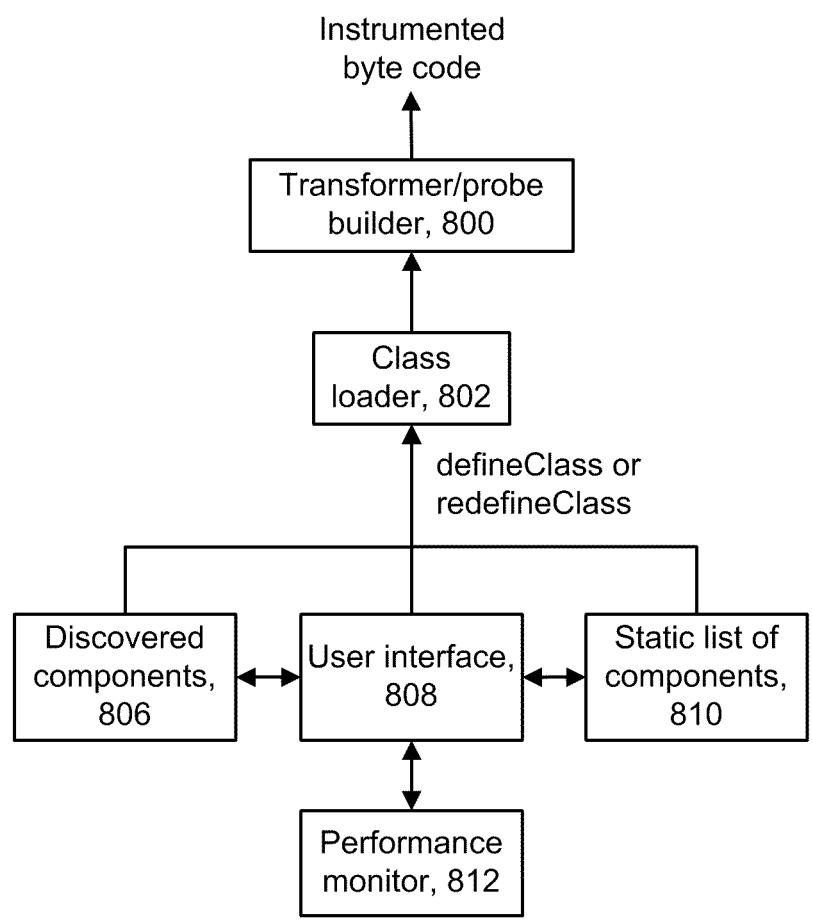
FIG. 8 depicts an example process flow for instrumenting software.
Figure 9:
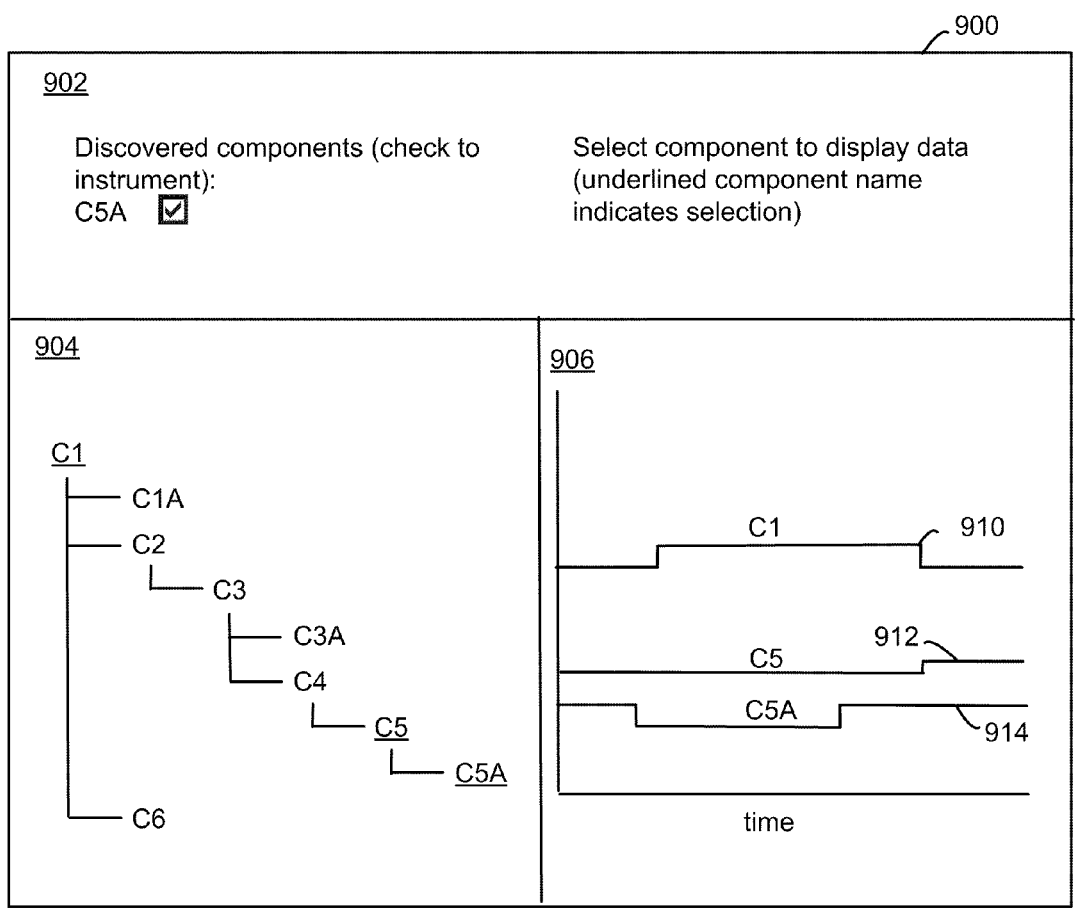
FIG. 9 depicts a user interface display which indicates a hierarchical relationship among components and corresponding performance data, and by which a user can manually identify a component to be instrumented.

FIG. 8 depicts an example process flow for instrumenting software. In correspondence with FIG. 5A, a static list of components 810 can be provided to a class loader 802, which loads byte code for use by a transformer/probe builder 800 to provide instrumented byte code. For instance, the method defineClass converts an array of bytes into an instance of class Class. Furthermore, discovered components 806, such as methods discovered by the process of FIG. 6, can be instrumented. In one approach, a user interface 808, such as depicted in FIG. 4C or 9, allows the user to designate discovered components to be instrumented. The user can also modify the static list 810. The user interface may be responsive to a performance monitor 812, which monitors performance data which is flowing in from the existing instrumentation in the managed application and identify, for instance, the fact that some components are causing a problem in a transaction, such as taking too much time to execute. The performance data can be compared to lower and upper thresholds to determine whether it is out of range.

A discovered component can include a dynamically updatable list of classes which should be instrumented. This list can change from time to time so that particular methods are instrumented for limited periods of time in which diagnosis is performed. The user interface 808 may specify the time period, or a default time period may be used. Thus, a component can be redefined, so that it transitions, e.g., from not having instrumentation at one point in time, to having instrumentation at another point in time. It is also possible to provide different types or levels of instrumentation, e.g., a high level of instrumentation, in which many aspects of the performance of a component are tracked, and a low level of instrumentation, in which only a few aspects of the performance of a component are tracked. Redefining a component can thus involve a transition to a different type of instrumentation.

Instrumentation can yield many types of performance metrics/data, including an average execution or response time of a component, an invocation rate per second or per interval, a count of invocations, a concurrency metric indicating a number of invocations that have started but not finished per interval, and a stalled metric indicating a number of invocations that have started whose method invocation times have exceeded a specific threshold per interval. Further, the data can identify a garbage collection heap size, a bandwidth metric indicating file and socket activity, a number of threads, system logs, exceptions, memory leaks and component interactions. The data can also identify which components are called by the instrumented component or which call the instrumented component. For instance, in a controller architecture, control flows in through a controller component, which has control over which components are executed next, and knows how often they are executing and how they are performing. The controller component can report, via instrumentation, on which un-instrumented components are being frequently invoked and therefore are perhaps of interest and should be redefined to add instrumentation.

As mentioned, it is possible to redefine a component to change its type of instrumentation. For example, more instrumentation may be added when the existing instrumentation detects a problem, e.g., due to one or more parameters being out of bounds. Also, the additional instrumentation may be subsequently removed when the instrumentation establishes that a normal condition has returned. The removal could be performed based on a user command, or automatically, without user intervention.

Note that the discovered components 806, user interface 808, static list of components 810 and performance monitor 812 can be provided at the same location or at different locations. For example, the user interface 808 can be provided at the user interface host 122 (FIG. 1), the discovered components 806 and the static list of component 810 can be provided at the application server 106 or 110, and the performance monitor 812 may be associated with the manager 120, which receives performance data from the agents 108 and 112 at the application servers 106 and 110, respectively.

The performance monitor 812 provides an idea of what components are involved in a problem transaction and can determine whether these components could be causing, or are causing, issues, and identify this information on the user interface 808.

The user interface 808 allows a user to manually pick and choose which components, including the discovered components, are to be instrumented or not instrumented, for instance. The type of instrumentation, when different types are available, could also be specified via the user interface.

The static list of components 810 may include classes or other components which are to be instrumented when the application begins running. This may be a baseline list of components which are expected to yield important data. In one approach, a list of the discovered components 806 can be persisted so that the next time the system starts up, the same components are instrumented. This allows the user to have constant data, reporting and performance data from a component, and provides a good way to allow the user to set up the environment.

A component can be redefined in different ways according to whether the component has already been incorporated into the application at runtime. If a component is not already incorporated into the application, it can be incorporated normally by being loaded by the class loader 802 such as in a JVM, in one possible implementation. In other implementations, such as those which use the .NET framework, a class loader is not used.

When a component is loaded, the transformer/probe builder 800 instruments the component if instructed, e.g., in response to the user interface 808, discovered components 806, static list of component 810 and performance monitor 812. A component which is already incorporated into the application, but is not instrumented, can be reincorporated into the application with instrumentation. For example, the component can be removed from the application and reloaded during the runtime without restarting the virtual machine. To achieve this, the JAVA redefineClass command is provided to the class loader 802 with the component. The JAVA DEVELOPMENT KIT (JDK) version 1.5 or higher has a redefinition capability which uses this command. This command redefines a supplied set of classes using supplied class files. It operates on a set in order to allow interlocked changes to more than one class at the same time. Moreover, if a redefined method has active stack frames, those active frames continue to run the byte codes of the original method, and the redefined method will be used on new invokes.

Redefining a component such as a class is analogous to restarting the virtual machine but only for that class. When a class is redefined, if the class is already in existing method stacks, it stays there. But, for every new method invocation, the new class is used. That is, once it is redefined, the new version is picked up.

When the transformer/probe builder 800 receives the redefined component, it instruments the component, if instructed to do so. The transformer/probe builder 800 could also add a specified type of instrumentation to the component.

After a discovered component has been instrumented and reincorporated into the application, and the instrumentation is no longer need for diagnosis, the component can be reincorporated into the application again, but without instrumentation. This removal of instrumentation can be based on a user command, a time out after a specified diagnosis period or other some other event. For instance, the performance monitor 812 may determine that performance data of the discovered component has been acceptable for a certain period of time or for number of invocations of the component. That is, the performance monitor 812 may determine that performance data of at least one method of the instrumented methods no longer fails to meet a threshold performance level. In response, the performance monitor 812 can issue a command, such as redefineClass, to remove the instrumentation.

The adding and removal of instrumentation can be done dynamically at runtime so that the virtual machine in which the byte code is executing does not have to be brought down, and data from the instrumented components can be accessed immediately (in the case of adding instrumentation).

FIG. 9 depicts a user interface display which indicates a hierarchical relationship among components and corresponding performance data, in which a user can manually identify a component to be instrumented. The user interface 900 includes a display region 902 which identifies the names of one or more components which have been discovered as callable components of a method being analyzed. The names of other components can also be provided. In this example, C5A is the sole discovered component. A checkbox next to the component name/identifier can be checked by a user to select instrumentation for the component. Or, instrumentation can be automatically applied to the component. The display region 902 also informs the user that the user can select one or more components in a display region 904 to display data, e.g., a trace, for that component based on its instrumentation in a display region 906.

Similarly, the user can uncheck a checked box to indicate that instrumentation should be removed from a component. For specifying different types of instrumentation, additional checkboxes or other user interface techniques may be used. Moreover, when the user initially views the user interface 900, the checkboxes can be pre-checked or unchecked according to their current instrumentation status. In some cases, a checkbox may be grayed out to indicate that the instrumentation status of a component cannot be changed, e.g., so that instrumentation is not inadvertently removed from critical components.

The user may indicate that instrumentation should be added to certain discovered components based on, e.g., observations of which components are involved in errors or have themselves generated an error, prior troubleshooting experience and other factors.

The display region 904 can be automatically populated with each of the components in the application using a hierarchical structure such as a tree which shows which components are under, or called by, another component. The display region 906 depicts performance data such as transaction traces of the instrumented components based on the instrumentation, for selected ones of the components in the region 904. For example, components C1, C5 and C5A are currently selected by a user, as indicated by the underlining of the component names, and corresponding performance data such as transaction traces is provided by curves 910, 912 and 914 in region 906. The region 906 can be populated with performance data provided from the agent to the central manager.

In some approaches, the displayed information in region 904 can be filtered so that only the discovered components are displayed. Moreover, the user can expand nodes of the tree to view lower level components of a node.

Figure 10:
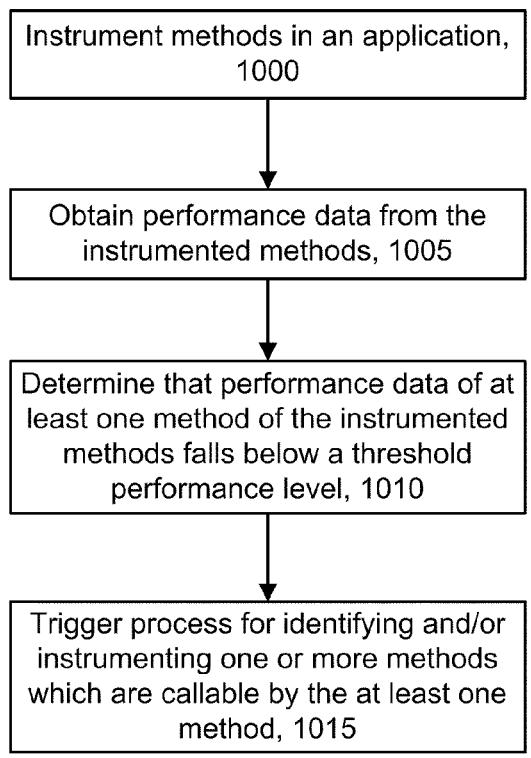
FIG. 10 provides further details of step 600 of FIG. 6.

FIG. 10 provides further details of step 600 of FIG. 6. The identification of at least one method in an application to analyze can be based on various factors. In one possible approach, the at least one method is identified based on performance data. In particular, step 1000 includes instrumenting methods in an application. For instance, this can involve static instrumentation such as discussed in connection FIGS. 5A and 5B. Step 1005 includes obtaining performance data from the instrumented methods. The performance data can be obtained on an ongoing basis and displayed on a user interface, with real-time updates, such as depicted in FIGS. 4A-C and 9. Various other displays such as bar charts, graphs, tables and so forth can also be provided. Step 1010 includes determining that performance data of at least one method of the instrumented methods falls below a threshold performance level. For example, in FIG. 4A, performance data can include the response time of C5 (442), which is t16-t11. Assume that this time, e.g., 5 time units, is too long, and exceeds a threshold performance level which requires the response time to be four time units or less. The component or method C5 can thus be identified as at least one method to analyze. In practice, performance data of many different methods can be continually evaluated against threshold levels to ensure they are within an expected range, and the methods that are not within an expected range can be flagged for analysis. Step 1015 triggers a process for identifying and/or instrumenting one or more methods which are callable by the at least one method, such as the process of steps 605 to 640 of FIG. 6.

FIG. 11 provides further details of step 640 of FIG. 6, regarding reporting and/or instrumenting one or more referenced methods. Step 1100 includes reporting the one or more referenced methods, that is, the methods which are callable by the at least one method which is being analyzed. A report can be in the form of a user interface display, for instance, as depicted in FIG. 4C. In FIG. 4C, the one or more referenced methods include the newly discovered component C5A. Step 1105 includes instrumenting the one or more referenced methods. This can involve, e.g., the techniques of FIG. 8. The instrumentation can be dynamic, e.g., so that the instrumentation can occur during a runtime of an application, and remote, e.g., where the application is remote from the user.

Step 1110 includes running the application with the one or more instrumented methods. In practice, the application may continue running with the one or more referenced methods which have instrumentation added. Step 1115 includes obtaining performance data for the one or more instrumented methods. Thus, due to the additional of instrumentation, performance data regarding the one or more discovered methods can now be obtained. This can be especially useful in diagnosing a problem involving the method. Step 1120 includes evaluating the performance data. This can be done automatically such as by comparing the performance data to an allowable range of values and setting a flag if the performance data is out of range, or otherwise below a minimum level or above a maximum level. Step 1125 includes triggering a process for identifying and/or instrumenting one or more methods which are callable by the one or more instrumented methods, such as described in FIG. 13. That is, an iterative technique can be performed in which there is a drill down to one level below an original method being analyzed, to a child method. Subsequently, if warranted by performance data of the child method, or for other reasons, a drill down can be performed to two levels below the original method being analyzed, to a grandchild method, or a child of the previous child method. The process can be repeated to analyze successively lower level methods in a hierarchy of methods.

In another possible approach, the initial drill down can be to two or more levels below the original method being analyzed, to both a child method and a grandchild method, for instance. Instrumentation can be added to both the child method and a grandchild method at the same time. Performance data from this instrumentation can indicate whether a drill down to, and instrumentation of, a further level is warranted.

FIG. 12 provides further details of step 640 of FIG. 6, regarding reporting and/or instrumenting one or more referenced methods. Step 1200 includes determining if a rule has been set indicating that the one or more referenced methods, that is, the newly discovered methods which are callable by at least one method which is being analyzed, should not be instrumented. In some cases, the rules 505 and 555 of FIGS. 5A and 5B may indicate that certain methods should not be instrumented. This can occur, e.g., when the method is native and therefore does not have byte code, when the class to which the method belongs is marked as not transformable by the JAVA API, or when the method/class has been marked as "skipped" by the agent probe builder directive (PBD) instrumentation, and we do not want to overrule that.

A report can be made via a user interface indicating that a rule indicated that the one or more referenced methods should not be instrumented. Step 1205 includes determining whether the one or more referenced methods are already instrumented. For instance, in some cases, a method may have instrumentation that is not activated, in which case it is possible to activate the instrumentation. Also, we may want to display to the user that a method has already been instrumented, therefore, if it does not see any information on it in the Transaction Components it is because it is not called. Step 1210 includes determining whether the one or more referenced methods are in an interface class. The user interface may report this fact and allow the user to provide a command to indicate whether the one or more referenced methods should be instrumented. In this case, instrumentation involves instrumenting all implementing classes. This may be a significant amount of instrumentation which may not be desirable in some cases.

The information of steps 1200 to 1210 may be provided by the agent using reflection for each of the possible method calls. The information supports the user in determining whether to add instrumentation to the callable methods. The information can be obtained through reflection on the class retrieved from the array of loaded classes, provided, e.g., by the JAVA 5 Instrument API. This information can be cached for subsequent access to avoid consuming computational resources in re-determining the information.

Figure 13:
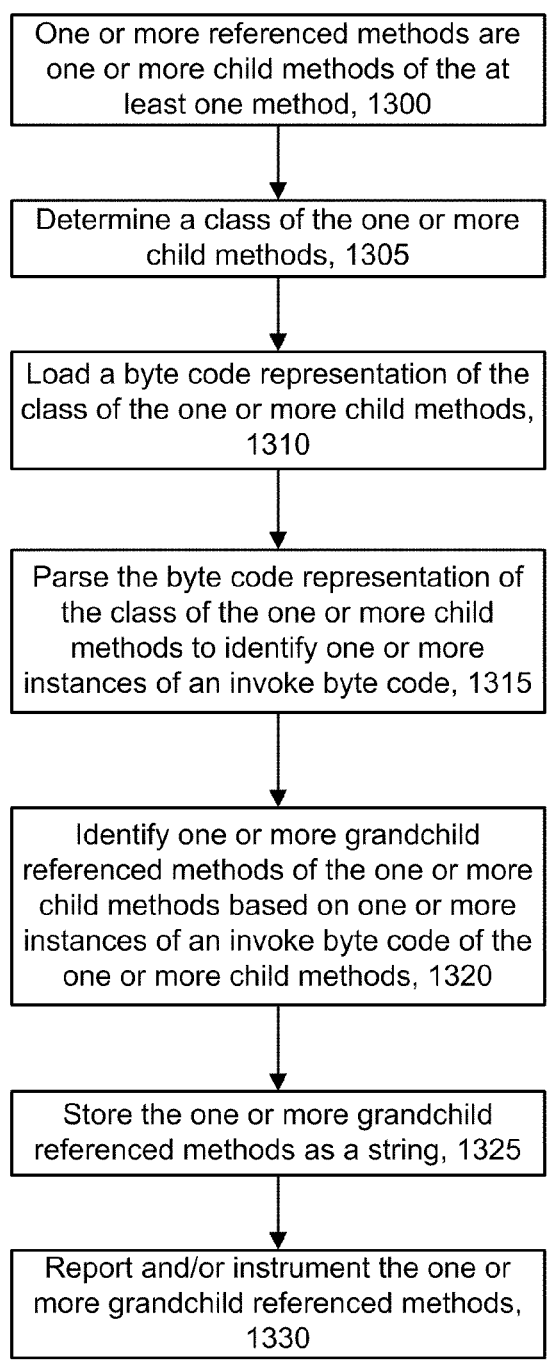
FIG. 13 provides further details of step 1125 of FIG. 11.

FIG. 13 provides further details of step 1125 of FIG. 11. The process of FIG. 13 is analogous to that of FIG. 6 but is explained in terms of one or more child methods. Step 1300 indicates that one or more referenced methods are one or more child methods of the at least one method, e.g., the at least one method to analyze in step 600 of FIG. 6. Step 1305 determines a class of the one or more child methods, similar to step 615 of FIG. 6. Step 1310 includes loading a byte code representation of the class of the one or more child methods, such as from an original resource location from which the byte code was obtained, similar to step 620 of FIG. 6. Step 1315 includes parsing a byte code representation of each class obtained in step 1305 to identify one or more instances of an invoke byte code, similar to step 625 of FIG. 6. Step 1320 identifies one or more grandchild referenced methods of the one or more child methods, based on the one or more instances of an invoke byte code (of step 1315) of the one or more child methods, similar to step 630 of FIG. 6. Step 1325 stores the one or more grandchild referenced methods as a string in cache, similar to step 635 of FIG. 6. Step 1330 includes reporting and/or instrumenting the one or more grandchild referenced methods, similar to step 640 of FIG. 6.

Figure 14:
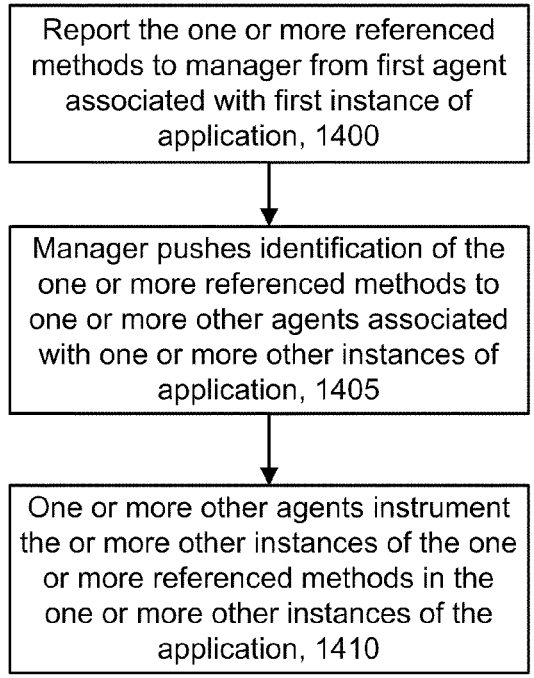
FIG. 14 provides further details of step 640 of FIG. 6.

FIG. 14 provides further details of step 640 of FIG. 6. As mentioned in connection with FIG. 1, multiple application servers may have respective agents which communicate with a central manager. Thus, the agents can be deployed in a cluster of JVMs that are running application servers that contain separate instances of the same code such as an application. When one agent, such as agent A1 108, analyzes at least one method in an application and determines one or more referenced methods, an identification of the one or more referenced methods can be shared with one or more other agents, such as via the manager 120. For example, the agent A1 (108) may signal to the manager 120 that a new set of method calls, e.g., callable methods, have been retrieved for a given class and method. The manager 120 can then decide to push the information to the other agents in the cluster, such as agent A2 (112), that may be interested. This will avoid unnecessary repetition of the method call detection steps on the other agents, and will allow the agents to gather performance data from different instances of the discovered callable methods. By viewing performance data for the same method across different instances of an application, greater insight can be gained to the operation of the application.

In an example process, step 1400 reports the one or more referenced methods to a manager from a first agent (108) associated with a first instance of an application. At step 1405, the manager pushes an identification of the one or more referenced methods to one or more other agents (112) associated with one or more other instances of the application. At step 1410, the one or more other agents instrument the one or more other instances of the one or more referenced methods in the one or more other instances of the application.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application, to thereby enable others skilled in the art to best utilize the invention in various embodiments and with various modifications as are suited to the particular use contemplated. It is intended that the scope of the invention be defined by the claims appended hereto.

What is claimed is:

1. A computer-implemented method, comprising:
   identifying a method to analyze in an application;
   determining a class of the method to analyze from among loaded classes in memory;
   loading a byte code representation of the class of the method to analyze from a resource location;
   parsing the byte code representation of the class of the method to analyze, the parsing identifies an instance of an invoke byte code in the byte code representation of the class of the method to analyze;
   based on the instance of the invoke byte code in the byte code representation of the class of the method to analyze, identifying a child referenced method of, the method to analyze;
   storing the child referenced method as a string;
   determining a class of the child referenced method;
   loading a byte code representation of the class of the child referenced method from a resource location;
   parsing the byte code representation of the class of the child referenced method to identify an instance of an invoke byte code in the byte code representation of the class of the child referenced method;
   based on the instance of the invoke byte code in the byte code representation of the class of the child referenced method, identifying a grandchild referenced method of the method to analyze; and
   storing the grandchild referenced method as a string.

2. The computer-implemented method of claim 1, wherein:
   for at least one of the method to analyze or the child referenced method, the invoke byte code comprises one or more of invokevirtual, invokespecial, invokestatic or invokeinterface.

3. The computer-implemented method of claim 1, further comprising:
   for at least one of the child referenced method or the grandchild referenced method, instrumenting the referenced method in the application, in response to the identifying of the referenced method.

4. The computer-implemented method of claim 1, wherein:
   for at least one of the method to analyze or the child referenced method, the instance of the invoke byte code is identified from an opcode in the byte code representation of the class.

5. The computer-implemented method of claim 4, wherein, for at least one of the method to analyze or the child referenced method:
   the opcode is associated with an index to an entry in a constant pool table; and
   the referenced method is identified using the index.

6. The computer-implemented method of claim 1, wherein:
   it is not known whether the child referenced method has been called by the method to analyze at a time of the identifying of the child referenced method.

7. The computer-implemented method of claim 1, wherein:
for at least one of the method to analyze or the child referenced method, the class is determined using a JAVA Instrument API.

8. The computer-implemented method of claim 1, wherein:
for at least one of the method to analyze or the child referenced method, the loading uses a JAVA class ClassLoader.

9. The computer-implemented method of claim 1, wherein:
the method to analyze is identified by instrumenting methods in the application, wherein the methods in the application comprise the method to analyze, and analyzing performance data obtained from the instrumenting.

10. The computer-implemented method of claim 1, further comprising:
for at least one of the child referenced method or the grandchild referenced method, providing information using a JAVA Reflection API to assist in a determination of whether to add instrumentation to the referenced method.

11. A computer-implemented method, comprising:
identifying an instrumented method to analyze in a first instance of an application at a first application server;
determining a class of the instrumented method from among loaded classes in memory;
loading a byte code representation of the class from a resource location;
parsing the byte code representation of the class to identify an instance of an invoke byte code;
based on the instance of the invoke byte code, identifying an un-instrumented method which is referenced by the instrumented method; and
reporting the un-instrumented method from the first application server to a central manager, the central manager pushes an identification of the un-instrumented method to a second instance of the application at a second application server.

12. The computer-implemented method of claim 11, further comprising:
instrumenting the un-instrumented method in the first and second instances of the application, in response to the identifying of the un-instrumented method.

13. The computer-implemented method of claim 11, wherein:
the un-instrumented method can be called by the instrumented method.

14. The computer-implemented method of claim 1, further comprising:
for at least one of the child referenced method or the grandchild referenced method, reporting the referenced method from a first application server to a central manager, the central manager pushes an identification of the referenced method to another instance of the application at a second application server for use by the second application server in instrumenting another instance of the referenced method in the another instance of the application.

15. A tangible computer-readable memory comprising computer readable software embodied thereon for programming a processor to perform a method, the method comprising:
loading code of an application into memory of a computer system, the loading comprises configuring the code of the application with a baseline set of instrumented components comprising instrumented methods, the code of the application also comprises un-instrumented methods;
while executing the code of the application in the memory, obtaining performance data from the instrumented methods;
based on the performance data, selecting an instrumented method of the instrumented methods to analyze;
based on the selecting, identifying a referenced method of the un-instrumented methods which is referenced by the instrumented method to analyze, the identifying the referenced method comprises:
determining a class of the instrumented method to analyze from among loaded classes in the memory;
loading a byte code representation of the class into the memory from a resource location;
parsing the byte code representation of the class to identify an instance of an invoke byte code; and
identifying the referenced method based on the instance of the invoke byte code; and
providing information to assist in a determination of whether to add instrumentation to the referenced method, the information indicates at least one of whether the referenced method should not be instrumented, whether the referenced method is already instrumented or whether the referenced method refers to an interface.

16. The tangible computer-readable storage memory of claim 15, wherein:
the instance of the invoke byte code is identified from an opcode in the byte code representation of the class;
the opcode is associated with an index to an entry in a constant pool table; and
the referenced method is identified using the index.

17. A system, comprising:
a processor-readable storage device comprising instructions; and
a processor, the processor configured to execute the instructions to:
determine a class of a method of an application from among loaded classes of the application in memory;
load a byte code representation of the class from a resource location;
parse the byte code representation of the class to identify an instance of an invoke byte code;
based on the instance of the invoke byte code, identify a referenced method;
store the referenced method as a string; and
provide information to assist in a determination of whether to add instrumentation to the referenced method, the information indicates at least one of whether the referenced method should not be instrumented, whether the referenced method is already instrumented or whether the referenced method refers to an interface.

18. The system of claim 17, wherein:
the instance of the invoke byte code is identified from an opcode in the byte code representation of the class.

19. The system of claim 18, wherein:
the opcode is associated with an index to an entry in a constant pool table; and
the referenced method is using the index.

* * * * *